United States Patent [19]

Ikemoto et al.

[11] Patent Number: 4,821,188

[45] Date of Patent: Apr. 11, 1989

[54] SYSTEM FOR VEHICLE HEIGHT ADJUSTMENT WITH STEERING ANGLE CHANGE RATE CORRECTION

[75] Inventors: Hiroyuki Ikemoto; Nobutaka Oowa; Yasuji Arai; Osamu Yasuike, all of Toyota; Shunichi Doi, Aichi, all of Japan

[73] Assignees: Toyota Jidosha Kabushiki Kaisha; Toyota Central Research and Development Laboratories, Inc., both of Aichi, Japan

[21] Appl. No.: 921,451

[22] Filed: Oct. 22, 1986

[30] Foreign Application Priority Data

Oct. 22, 1985 [JP] Japan .................. 60-235653

[51] Int. Cl.$^4$ .............................................. B60G 17/10
[52] U.S. Cl. .................................. 364/424.1; 280/707
[58] Field of Search ................ 364/424, 426; 280/707, 280/6.1, 6 R, 6 H; 188/279, 280, 299

[56] References Cited

U.S. PATENT DOCUMENTS

| | | | |
|---|---|---|---|
| 4,575,116 | 3/1986 | Miyata | 280/707 |
| 4,621,832 | 11/1986 | Nakashima et al. | 364/424 X |
| 4,624,476 | 11/1986 | Tanaka et al. | 280/707 |
| 4,624,477 | 11/1986 | Kumagai et al. | 280/707 |
| 4,625,994 | 12/1986 | Tanaka et al. | 280/707 |
| 4,647,069 | 3/1987 | Ijima | 280/707 |
| 4,693,493 | 9/1987 | Ikemoto et al. | 280/707 |

FOREIGN PATENT DOCUMENTS

| | | |
|---|---|---|
| 0035330 | 9/1981 | European Pat. Off. . |
| 0115202 | 8/1984 | European Pat. Off. . |
| 0114757 | 8/1984 | European Pat. Off. . |
| 2155207 | 9/1985 | United Kingdom . |
| 2155658 | 9/1985 | United Kingdom . |

Primary Examiner—Parshotam S. Lall
Assistant Examiner—Thomas G. Black
Attorney, Agent, or Firm—Oliff & Berridge

[57] ABSTRACT

In this vehicle height adjustment system, a plurality of actuator assemblies are provided, one corresponding to each one of the vehicle wheels and resiliently suspending it from the vehicle body. These actuator assemblies have pressure chambers, and each is adapted to increase or decrease the vehicle height at a location corresponding to its corresponding wheel as respective results of supplying or discharging of working fluid to or from its pressure chamber. Working fluid supply/discharge means are provided corresponding to the actuator assemblies and supply and discharge working fluid to and from their pressure chambers. Vehicle height detection means are provided for sensing the heights of the vehicle above the wheels. A means detects the rate of change of the steering angle of the vehicle. And a means for computing and control controls the working fluid supply/discharge means, based on the deviations of the actual wheel heights from standard wheel heights, and carries out control adjustment of the actual wheel heights to the standard wheel heights, by performing a prediction calculation of the fluctuations in wheel heights caused by vehicle rolling from the rate of change of steering angle as detected by the means for detecting the rate of change of steering angle and from the vehicle speed as detected by the vehicle speed detecting means, and by carrying out a correction to the adjustment control of the working fluid supplying and discharging means, based upon the calculation result, by an amount appropriate substantially to eliminate the wheel height fluctuations.

3 Claims, 10 Drawing Sheets

SYSTEM FOR VEHICLE HEIGHT ADJUSTMENT WITH STEERING ANGLE CHANGE RATE CORRECTION

BACKGROUND OF THE INVENTION

The present invention relates to a vehicle height adjustment system for an automotive vehicle, and more specifically relates to a vehicle height adjustment system of the suspension height adjustment type which is particularly adapted for preventing vehicle body roll.

The present invention has been described in Japanese Patent Application Ser. No. 60-235653 (1985), filed by applicants the same as the applicants or those assigned or owed duty of assignment of the present patent application; and the present patent application hereby incorporates into itself by reference the text of said Japanese Patent Application and the claims and the drawings thereof; a copy is appended to the present application.

Further, the present inventors wish hereby to attract the attention of the examining authorities to copending patent applications Ser. Nos. 921,138 now Pat. No. 4,797,823 filed Oct. 21, 1986, 921,251 filed Oct. 21, 1985 now Pat. No. 4,693,493, 921,450 filed Oct. 22, 1986 now patent number 4,821,191 and 921,468 filed Oct. 2, 1986 which may be considered to be material to the examination of the present patent application.

The following problem can arise in the case where a vehicle is fitted with a vehicle height adjustment system comprising: a plurality of actuators which are provided for resiliently suspending the vehicle wheels from its body and which are adapted to increase or decrease vehicle height at locations corresponding to the associated vehicle wheels as respective results of supplying or discharging working fluid to or from variable volume working fluid pressure chambers of said actuators; a plurality of working fluid supplying and discharging means which are provided corresponding to the actuators and which serve to supply or discharge the working fluid to or from said pressure chambers of said actuators (such working fluid supplying and discharging means are often controlled by duty ratio control or by the voltages of electrical signals supplied to them); a vehicle height detecting means for sensing vehicle body heights over the various wheels thereof (the terms "wheel height" and "suspension height" will be utilized without particular distinction hereinafter in this specification, although strictly speaking it is the suspended heights of the portions of the vehicle body over each of its wheels as set by the vehicle suspension system which are meant); and a control means for controlling the various working fluid supplying and discharging means based upon the data sensed by the vehicle height detecting means in order to control the adjustment of the suspension heights of the vehicle wheels to certain determinate wheel heights, as proposed, for example, in the specifications of Japanese Patent Laying Open Publication Ser. No. Sho 60-85005 (1985) and Japanese Patent Laying Open Publication Ser. No. Sho 60-235654 (1985), both of which were filed by an applicant the same as one of the applicants or one of the assignees or one of the entities owed duty of assignment of the present patent application, and which is not intended hereby to admit as prior art to the present patent application except to the extent in any case required by applicable law. Namely, in such a case, the hydraulic fluid supply and draining means for the actuators are controlled by the control device according to a feedback process, based upon the deviations between the actual wheel heights and certain determinate target wheel heights (or "standard" wheel heights), as a result of which the suspension height of the whole vehicle, taken overall, can indeed be satisfactorily adjusted; but, in the operational conditions when the vehicle is turning as for example around a curve, even though the hydraulic fluid supply and draining means for the actuators are controlled by the control device according to such a feedback process, nevertheless, due to response delays in the operation of the hydraulic fluid supply and draining means, the body of the vehicle may tend to experience rolling, i.e. the vehicle body may incline in the radially outward direction and may tip towards the wheels on its radially outward edge, and this body rolling can easily result in deterioration of the drivability of the vehicle.

In order to cope with the above problems, it might be considered, during such a turn, to increase the damping effect of those of the shock absorber means which are fitted to said vehicle wheels on the radially outward edge of the vehicle, and/or to increase the spring constant of those of the spring means which are fitted to said vehicle wheels on the radially outward edge of the vehicle. Such a concept is outlined in Japanese Patent Laying Open Publication Ser. No. 59-120509 (1984) and in Japanese Patent Application Ser. No. Sho 59-172416 (1984), neither of which is it intended hereby to admit as prior art to the present patent application except to the extent in any case required by applicable law; and reference should also be made to Japanese Utility Model Laying Open Publication Ser. No. 59-35105 (1984), Japanese Patent Laying Open Publication Ser. No. 53-26021 (1978), Japanese Patent Laying Open Publication Ser. No. 58-167210 (1983), and Japanese Utility Model Laying Open Publication Ser. No. 56-147107 (1981), again none of which is it intended hereby to admit as prior art to the present patent application except to the extent in any case required by applicable law. However, with these concepts, merely the suspension of the vehicle on the outer side edge thereof with respect to the turn is hardened, and thus the rolling of the vehicle body may be somewhat attenuated as compared with the case when such suspension hardening is not performed, but the rolling of the vehicle body cannot necessary be adequately prevented. Accordingly, such a concept does not really resolve the problem.

SUMMARY OF THE INVENTION

The present invention considers the problems described above which arise with such a vehicle height adjustment system, and has as its primary object to avoid the problems detailed above.

Another object of the present invention is the provision of an improved vehicle height adjustment system which controls the working fluid supplying and discharging means for the suspension actuators so as to maintain the wheel heights at standard wheel heights.

Another object of the present invention is the provision of an improved vehicle height adjustment system which controls the working fluid supplying and discharging means for the suspension actuators so as to prevent the vehicle body from rolling.

Yet another object of the present invention is to provide a vehicle height adjustment system which improves vehicle overall drivability.

Yet another object of the present invention is to provide a vehicle height adjustment system which improves vehicle steering stability.

According to the most general aspect of the present invention, the above and other objects are attained by, for a vehicle comprising a body and a plurality of wheels upon which said vehicle runs, a vehicle height adjustment system, comprising: (a) a plurality of actuator assemblies, one provided corresponding to each one of said vehicle wheels and resiliently suspending said one of said vehicle wheels from the vehicle body, said actuator assemblies comprising pressure chambers and each increasing and decreasing vehicle height at a location corresponding to its corresponding vehicle wheel as respective results of supply of working fluid to and discharge of working fluid from its said pressure chamber; (b) a plurality of working fluid supplying and discharging means, which are provided corresponding to said actuator assemblies, for supplying working fluid to said pressure chambers and for discharging working fluid from said pressure chambers; (c) a plurality of vehicle height detection means, which are provided corresponding to said vehicle wheels, for sensing parameters representative of the heights of the vehicle body over said vehicle wheels; (d) a means for detecting the rate of change of the steering angle of the vehicle; and: (e) a computing and control means for controlling said working fluid supplying and discharging means based on the deviations of the actual wheel heights as detected by said vehicle height detection means from standard wheel heights, and carrying out control adjustment of said actual wheel heights to said standard wheel heights, by performing a prediction calculation of the fluctuations in wheel heights caused by vehicle rolling from the rate of change of steering angle as detected by said means for detecting said rate of change of steering angle and from the vehicle speed as detected by said vehicle speed detecting means, and by carrying out a correction to the adjustment control of said working fluid supplying and discharging means, based upon the calculation result, by an amount appropriate substantially to eliminate said wheel height fluctuations.

According to such a construction as specified above, with the control means controlling the working fluid supplying and discharging means based on the deviations of the actual wheel heights detected by said wheel height detection means from standard wheel heights and carrying out a control adjustment of the wheel heights to the standard wheel heights, the operation is such as to carry out prediction calculations of the fluctuations in wheel heights caused by vehicle body roll from the rate of change of the vehicle steering angle as detected by the steering angle change rate sensor and from the vehicle road speed as detected by the vehicle road speed sensor, and so as to carry out corrections to the adjustment control of the working fluid supplying and discharging means based on the results of such calculations by amounts necessary substantially to eliminate said wheel height fluctuations, and therefore not only can the wheel heights be adjusted to the standard wheel heights, but also when the vehicle is turning around a curve rolling of the vehicle body can be effectively prevented.

According to a more detailed aspect of the present invention, the above and other objects are more particularly attained by a vehicle height adjustment system of the above construction, wherein said computing and control means is for, when the deviations between the actual wheel heights and the standard wheel heights are less than certain values, regarding said deviations as zero.

According to this construction, when the deviations between the actual wheel heights and the standard wheel heights are less than certain values, the control means operates so as to regard these deviations as zero. According to this construction, when the wheel height deviations are less than said certain values, supply and drain of working fluid to the pressure chambers based on the wheel height deviations is not carried out, and therefore the actuating electrical energy required to drive the working fluid supply and draining means can be economized upon, and moreover the so called hunting phenomenon, whereby because of minute variations in the actual wheel heights from the standard heights the wheel heights are repeatedly subject to increase and decrease adjustment within a fine range, can be avoided, and thereby the stability of the operation of the wheel height adjustment system can be improved.

According to another more detailed aspect of the present invention, the above and other objects are more particularly attained by a vehicle height adjustment system of the above construction, wherein said computing and control means is for, when said steering angle rate of change is less than a certain value, regarding said steering angle rate of change as zero.

According to this construction, when the steering angle rate of change is less than a certain value, the control means operates so as to regard this steering angle rate of change as zero. According to this construction, when the steering angle rate of change is less than said certain value, supply and draining of the working fluid to the pressure chambers based on the steering angle rate of change is not carried out, and therefore the actuating electrical energy required to drive the working fluid supply and draining means can be conserved, and moreover the so called hunting phenomenon whereby because of fluctuations in the steering angle rate of change within a minute range including zero the wheel heights are repeatedly subjected to increase and decrease adjustment within a fine range, can be avoided, and thereby the stability of the operation of the wheel height adjustment device can be improved.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and:

DESCRIPTION OF THE PREFERRED EMBODIMENT

Figure 1:
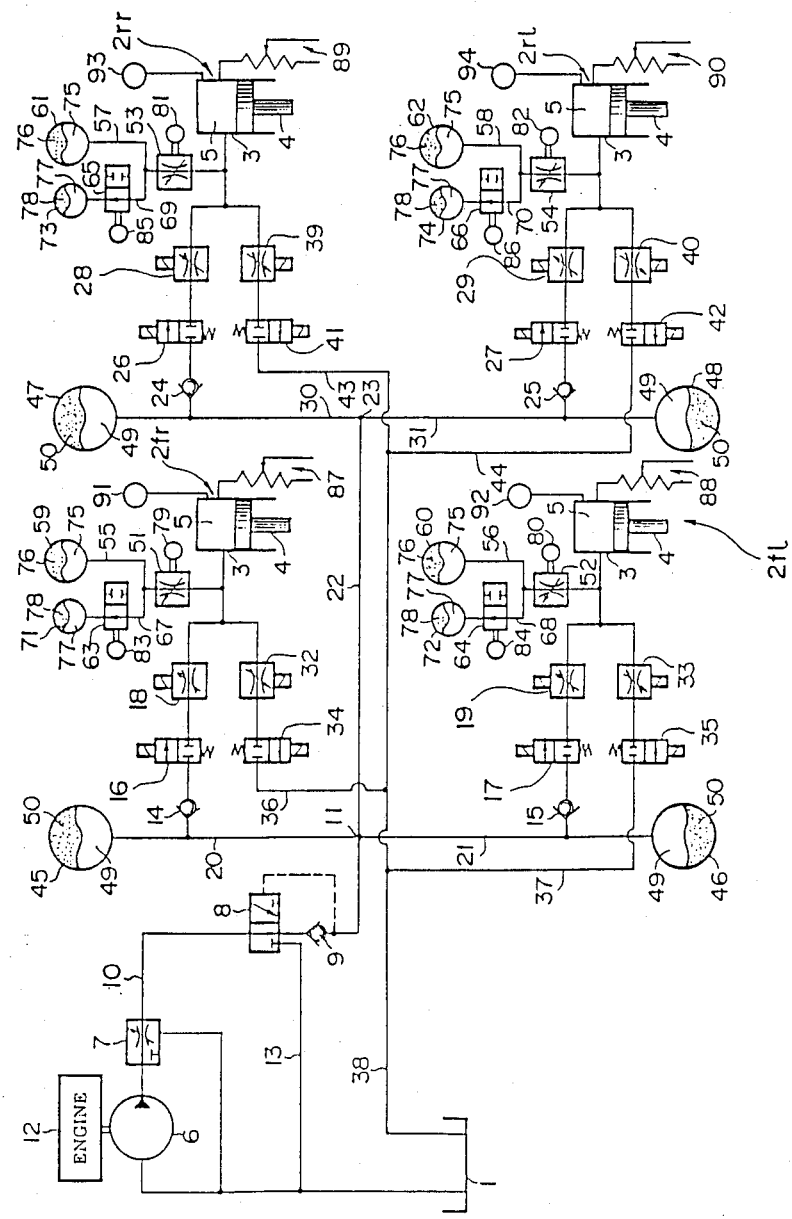
FIG. 1 is a schematic structural diagram showing major physical components of the preferred embodiment of the system for vehicle height adjustment for an automotive vehicle of the present invention which will be described.
Figure 2:
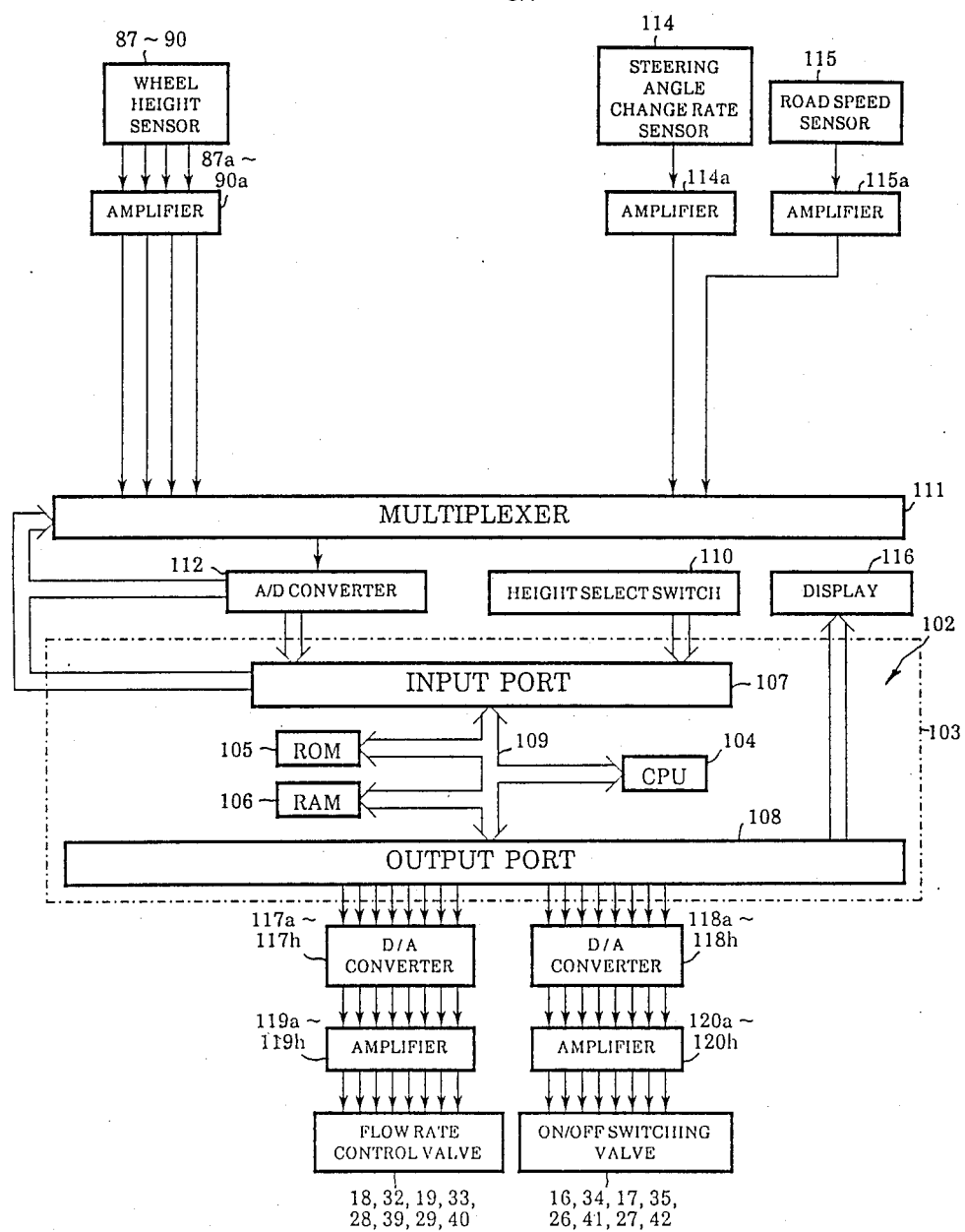
FIG. 2 is an idealized block diagrammatical view showing the internal construction of an electrical control device of a type incorporated in said preferred embodiment of the present invention, said electrical control device incorporating a micro computer.

The present invention will now be described with reference to the preferred embodiment thereof, and with reference to the figures. FIG. 1 is a schematic diagram showing major physical components of said preferred embodiment of the vehicle height adjustment system of the present invention, and FIG. 2 is a block diagrammatical view showing the internal construction of an electrical control device incorporating a micro computer, incorporated in said preferred embodiment.

OVERALL SUSPENSION SYSTEM CONSTRUCTION

Figure 3:
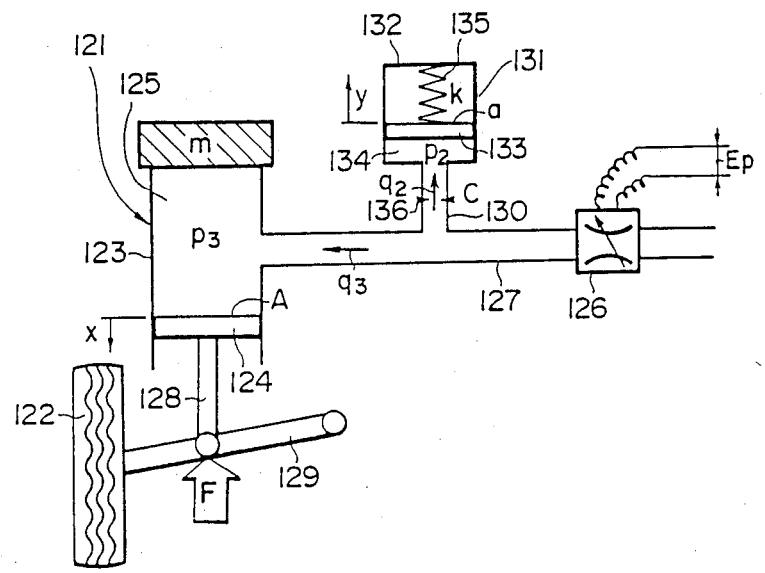
FIG. 3 is a schematic diagram of a single wheel model, showing a single vehicle wheel and a suspension system therefor including an actuator, for explaining the necessary characteristics of a gain variable G(V) and a filter F(V) in a voltage correction value $Ep=G(V)\cdot F(V)\cdot \omega$ due to the roll prediction of the voltage of the actuating electrical energy to be supplied to the various flow control valves of FIG. 1, in this preferred embodiment of the present invention.

Referring first to FIG. 1 which shows the gross mechanical components incorporated in the preferred embodiment of the vehicle height adjustment system of the present invention that are utilized for vehicle height and ride adjustment in this figure the reference numeral 1 denotes a suspension working fluid reservoir or sump, while 2fl, 2fr, 2rl, and 2rr are actuator assemblies which are provided to, respectively the front left vehicle wheel, the front right vehicle wheel, the rear left vehicle wheel, and the rear right vehicle wheel; one of these vehicle wheels is schematically shown in FIG. 3. And, in and for each of said actuators assemblies 2fl, 2fr, 2rl, and 2rr, the reference numeral 3 denotes a cylinder and the reference numeral 4 denotes a piston sliding in said cylinder and cooperating with a closed end thereof to define an actuating pressure chamber 5. Each of said vehicle wheels is rotationally mounted about a substantially horizontal axis to a member such as a suspension arm (shown schematically in FIG. 3 and denoted therein by the reference numeral 129) or the like which is suspended from the body (not shown) of the vehicle by means of a flexible linkage of some per se known sort, and each of said actuator assemblies 2fl, 2fr, 2rl, and 2rr is arranged to have one of its cylinder 3 and its piston 4 (its piston 4, in the exemplary schematic illustration of FIG. 3) drivingly coupled to one of said vehicle body and said suspension arm (exemplarily to the suspension arm 129, via the piston rod 128), while the other of its said cylinder 3 and said piston 4 is drivingly coupled to the other of said vehicle body and said suspension arm. Thus, by pressurization by suspension working fluid (abbreviated hereinafter merely as "fluid") of the pressure chamber 5 defined by said cylinder 3 and said piston 4, each of said actuator assemblies 2fl, 2fr, 2rl, and 2rr serves for maintaining and adjusting the sprung height from the road surface of the portion of the vehicle body above its associated vehicle wheel, and for determining the characteristics of the springing of said vehicle body with respect to said associated vehicle wheel. In other possible embodiments of the vehicle height adjustment system of the present invention, other constructions (such as hydraulic ram type devices) would be possible for these actuator assemblies 2fl, 2fr, 2rl, and 2rr, as long as each said actuator assembly was capable of increasing and decreasing the sprung height of the portion of the vehicle body above its associated vehicle wheel, corresponding to the supply and the discharge of fluid to a working fluid chamber of said actuator assembly or corresponding to some other control function exerted from a controller, and as long as the pressure in the working fluid chamber increased and decreased in response respectively to bound and rebound of said associated vehicle wheel (or the functional like).

Working fluid for the operation of this suspension system, such as specialized type of oil or the like, is sucked up from the reservoir 1 by a fluid pump 6 rotationally driven by the engine 12 of the vehicle to which this suspension system is fitted, and a pressurized supply thereof is fed via a conduit 10 through, in order, a flow rate control valve 7, a load mitigating valve 8, and a one way check valve 9 to a conduit junction point 11, and from this junction point 11 via another conduit 22 said pressurized fluid is fed to another conduit junction point 23. This flow rate control valve 7 is constructed so as to control the flow rate of fluid in the conduit 10 according to a signal which it receives. The load mitigating valve 8 is constructed so as to be responsive to the pressure in the conduit 10 downstream of the one way check valve 9 and so as to vent a certain amount of the pressurized fluid in said conduit 10 via a conduit 13 back to a point in the conduit 10 upstream of the pump 6, so as to maintain said pressure in the conduit 10 downstream of the one way check valve 9 at no more than a determinate pressure value. And the check valve 9 prevents the fluid from flowing backwards through the conduit 10 from the conduit junction points 11 and 23 towards the load mitigating valve 8.

The conduit junction point 11 is connected to the cylinder chamber 5 of the actuator 2fr for the front right vehicle wheel via a conduit 20 at intermediate points along which there are provided, in order, a one way check valve 14, an electrically controlled ON/OFF switching valve 16, and an electrically controlled flow rate control valve 18. Similarly, said conduit junction point 11 is connected to the cylinder chamber 5 of the actuator 2fl for the front left vehicle wheel via a conduit 21 at intermediate points along which there are provided, in order, a one way check valve 15, an electrically controlled ON/OFF switching valve 17, and an electrically controlled flow rate control valve 19. The other conduit junction point 23 is connected to the cylinder chamber 5 of the actuator 2rr for the rear right vehicle wheel via a conduit 30 at intermediate points along which there are provided, in order, a one way check valve 24, an electrically controlled ON/OFF switching valve 26, and an electrically controlled flow rate control valve 28. Similarly, said other conduit junction point 23 is connected to the cylinder chamber 5 of the actuator 2rl for the rear left vehicle wheel via a conduit 31 at intermediate points along which there are provided, in order, a one way check valve 25, an electrically controlled ON/OFF switching valve 27, and an electrically controlled flow rate control valve 29. Thus, the cylinder chambers 5 for the actuators 2fr, 2fl, 2rr, and 2rl are selectively supplied with working fluid from the reservoir 1, as pressurizied by the pump 6, via the conduits 10, 20 and 21, 22, and 30 and 31, with, as will be described in detail hereinbelow, such supply of pressurized fluid and the flow rate thereof being appropriately and properly controlled by the supply of actuating electrical energy to the electrically controlled ON/OFF switching valves 16, 17, 26, and 27 and to the electrically controlled flow rate control valves 18, 19, 28, and 29.

To a point of the conduit 20 between the electrically controlled flow rate control valve 18 and the cylinder chamber 5 of the actuator 2fr for the front right vehicle wheel there is communicated one end of a conduit 36, the other end of which is connected to a drain conduit 38. At intermediate points on said conduit 36 there are provided an electrically controlled flow rate control valve 32 and an electrically controlled ON/OFF switching valve 34. Similarly, to a point of the conduit 21 between the electrically controlled flow rate control valve 19 and the cylinder chamber 5 of the actuator 2fl for the front left vehicle wheel there is communicated one end of a conduit 37, the other end of which is connected to said drain conduit 38, and at intermediate points on said conduit 37 there are provided an electrically controlled flow rate control valve 33 and an electrically controlled ON/OFF switching valve 35. And to a point of the conduit 30 between the electrically controlled flow rate control valve 28 and the cylinder chamber 5 of the actuator 2rr for the rear right vehicle wheel there is communicated one end of a conduit 43, the other end of which is connected to the drain conduit 38, and at intermediate points on said conduit 43 there are provided an electrically controlled flow rate control valve 39 and an electrically controlled ON/OFF switching valve 41, while also to a point of the conduit 31 between the electrically controlled flow rate valve 29 and the cylinder chamber 5 of the actuator 2rl for the rear left vehicle wheel there is communicated one end of a conduit 44, the other end of which is connected to said drain conduit 38, and at intermediate points on said conduit 44 there are provided an electrically controlled flow rate control valve 40 and an electrically controlled ON/OFF switching valve 42. Thus, the cylinder chambers 5 for the actuators 2fr, 2fl, 2rr, and 2rl are selectively exhausted of presurized fluid to the reservoir 1 via the conduits 36, 37, 43, 44, and 38, with, as will be described in detail hereinbelow, such exhausting of pressurized fluid and the flow rate thereof being appropriately and properly controlled by the supply of actuating electrical energy to the electrically controlled ON/OFF switching valves 34, 35, 41, and 42 and to the electrically controlled flow rate control valves 32, 33, 39, and 40.

In this shown construction, although such constructional details should be understood as not limitative of the present invention, the electrically controlled ON/OFF switching valves 16, 17, 26, 27, 34, 35, 41, and 42 are constructed as normally closed switching valves incorporating such devices as solenoids (not particularly shown), and, when no actuating electrical energy is supplied to the coil (not shown either) of any one of said solenoids, the respective one of said switching valves 16, 17, 26, 27, 34, 35, 41, and 42 is closed as schematically shown in the figure so as to intercept and so as to prevent flow of fluid in the conduit to which said switching valve is fitted, while on the other hand, when actuating electrical energy is supplied to said coil of said one of said solenoids, said respective one of said switching valves 16, 17, 26, 27, 34, 35, 41, and 42 is opened as also schematically shown in the figure so as to allow flow of fluid in said conduit to which said switching valve is fitted. Also, the electrically controlled flow rate control valves 18, 19, 28, 29, 32, 33, 39, and 40 are constructed so as to vary the degree of restriction which they apply according to the duty ratio of the current or the voltage of actuating electrical pulse signals which they receive, so as to thereby control the flow rate of fluid flowing through the conduits 20, 21, 30, 31, 36, 37, 43, and 44 respectively associated with said flow rate control valves and draining them.

To a point on the conduit 20 intermediate between the junction point 11 and the one way check valve 14, i.e. upstream of said one way check valve 14, there is connected an accumulator 45 which has a fluid chamber 49 and an air chamber 50 which are separated from one another by a diaphragm. This accumulator 45 serves to absorb fluctuations in pressure set up in the conduit 10 due to pulsations in the fluid provided by the pump 6 and due to the action of the load mitigating valve 8, and to accumulate pressure for the fluid in the conduit 20. Similarly, to a point on the conduit 21 intermediate between the junction point 11 and the one way check valve 15, i.e. upstream of said one way check valve 15, there is connected an accumulator 46 which has a fluid chamber 49 and an air chamber 50 which are separated from one another by a diaphragm. This accumulator 46 similarly serves to absorb fluctuations in pressure set up in the conduit 10 due to pulsations in the fluid supply provided by the pump 6 and due to the action of the load mitigating valve 8, and to accumulate pressure for the fluid in the conduit 21. And, likewise, to a point on the conduit 30 intermediate between the junction point 11 and the one way check valve 24, i.e. upstream of said one way check valve 24, there is connected an accumulator 47 which has a fluid chamber 49 and an air chamber 50 which are separated from one another by a diaphragm, and this accumulator 47 serves to absorb fluctuations in pressure set up in the conduit 22 due to pulsations in the fluid supply provided by the pump 6 and due to the action of the load mitigating valve 8, and to accumulate pressure for the fluid in the conduit 30; while, similarly, to a point on the conduit 31 intermediate between the junction point 11 and the one way check valve 25, i.e. upstream of said one way check valve 25, there is connected an accumulator 48 which has a fluid chamber 49 and an air chamber 50 which are separated from one another by a diaphragm; and this accumulator 48 similarly serves to absorb fluctutions in pressure set up in the conduit 22 due to pulsations in the fluid supply provided by the pump 6 and due to the action of the load mitigating valve 8, and to accumulate pressure for the fluid in the conduit 31.

To another point on the conduit 20 intermediate between the electrically controlled flow rate control valve 18 and the actuator 2fr for the front right vehicle wheel there is connected one end of a conduit 55, to the other end of which there is connected a main spring 59 which has a fluid chamber 75 and an air chamber 76 which are separated from one another by a diaphragm. At an intermediate point of said conduit 55 there is fitted a flow rate control valve 51 which is controlled by an electrically operated motor 79. And to a point on said conduit 55 between said flow rate control valve 51 and said main spring 59 there is connected one end of a conduit 67, to the other end of which there is connected a subspring 71 which has a fluid chamber 77 and an air chamber 78 which are separated from one another by a diaphragm. At an intermediate point of said conduit 67 there is fitted a normally open type ON/OFF switching valve 63 which is controlled by an electrically operated motor 83. Thus, as the volume of the cylinder chamber 5 of this actuator 2fr for the front right vehicle wheel varies in response to the bound and the rebound of said front right vehicle wheel and air compressed therein is squeezed and unsqueezed, the fluid in said cylinder chamber 5 and in the fluid chambers 75 and 77 of this main spring 59 and this subspring 71 flows to and fro therebetween through the flow rate control valve 51, and the flow resistance caused thereby produces a vibratory damping effect. Similarly, to a point on the conduit 21 intermediate between the electrically controlled flow rate control valve 19 and the actuator 2fl for the front left vehicle wheel there is connected one end of a conduit 56, to the other end of which there is connected a main spring 60 which has a fluid chamber 75 and an air chamber 76 which are separated from one another by a diaphragm, and at an intermediate point of said conduit 56 there is fitted a flow rate control valve 52 which is controlled by an electrically operated motor 80. And to a point on said conduit 56 between said flow rate control valve 52 and said main spring 60 there is connected one end of a conduit 68, to the other end of which there is connected a subspring 72 which has a fluid chamber 77 and an air chamber 78 which are separated from one another by a diaphragm. At an intermediate point of said conduit 68 there is fitted a normally open type ON/OFF switching valve 64 which is controlled by an electrically operated motor 84. Thus, as the volume of the cylinder chamber 5 of this actuator 2fl for the front left vehicle wheel varies in response to the bound and the rebound of said front left vehicle wheel and air compressed therein is squeezed and unsqueezed, the fluid in said cylinder chamber 5 and in the fluid chambers 75 and 77 of this main spring 60 and this subspring 72 similarly flows to and fro therebetween through the flow rate control valve 52, and the flow resistance caused thereby similarly produces a vibratory damping effect. And, with relation to the rear suspension for the vehicle, to a point on the conduit 30 intermediate between the electrically controlled flow rate control valve 28 and the actuator 3fr for the rear right vehicle wheel there is similarly connected one end of a conduit 57, to the other end of which there is connected a main spring 61 which likewise has a fluid chamber 75 and an air chamber 76 which are separated from one another by a diaphragm. At an intermediate point of said conduit 57 there is fitted a flow rate control valve 53 which is controlled by an electrically operated motor 81, and to a point on said conduit 57 between said flow rate control valve 53 and said main spring 61 there is connected one end of a conduit 69, to the other end of which there is connected a subspring 73 which also has a fluid chamber 77 and an air chamber 78 which are separated from one another by a diaphragm. And at an intermediate point of said conduit 69 there is likewise fitted a normally open type ON/OFF switching valve 65 which is controlled by an electrically operated motor 85. Thus, as the volume of the cylinder chamber 5 of this actuator 2fr for the rear right vehicle wheel varies in response to the bound and the rebound of said rear right vehicle wheel and air compressed therein is squeezed and unsqueezed, the fluid in said cylinder chamber 5 and in the fluid chambers 75 and 77 of this main spring 61 and this subspring 73 flows to and fro therebetween through the flow rate control valve 53, and the flow resistance caused thereby likewise produces a vibratory damping effect. Similarly, to a point of the conduit 31 intermediate between the electrically controlled flow rate control valve 29 and the actuator 2fl for the rear left vehicle wheel there is connected one end of a conduit 58, to the other end of which there is connected a main spring 62 which likewise has a fluid chamber 75 and an air chamber 76 which are separated from one another by a diaphragm, and at an intermediate point of said conduit 58 there is fitted a flow rate control valve 54 which is controlled by an electrically operated motor 82. And to a point on said conduit 58 between said flow rate control valve 54 and said main spring 62 there is connected one end of a conduit 70, to the other end of which there is connected a subspring 74 which has a fluid chamber 77 and an air chamber 78 which are separated from one another by a diaphragm. At an intermediate point of said conduit 70 there is fitted a similar normally open type ON/OFF switching valve 66 which is controlled by an electrically operated motor 86. Thus, as the volume of the cylinder chamber 5 of this actuator 2fl for the rear left vehicle wheel varies in response to the bound and the rebound of said rear left vehicle wheel and air compressed therein is squeezed and unsqueezed, the fluid in said cylinder chamber 5 and in the fluid chambers 75 and 77 of this main spring 62 and this subspring 74 similarly flows to and fro therebetween through the flow rate control valve 54, and the flow resistance caused thereby similarly produces a vibratory damping effect.

As will be particularly explained hereinafter, in the preferred embodiment of the vehicle height adjustment system of the present invention which will be described, the damping effect C for each of the four vehicle wheels is arranged to be switched between various levels according to control of the flow resistance of the flow rate control valves 51, 52, 53, and 54 by the associated repsective electric motors 79, 80, 81, and 82. Also, the springing effect or spring rate, i.e. the modulus of elasticity of springing, of each of the four vehicle wheels is arranged to be switched between two levels—high and low—according to control of the opening and closing of the ON/OFF switching valves 63, 64, 65, and 66 by the associated respective electric motors 83, 84, 85, and 86. And, as will be described shortly, the electric motors 79, 80, 81, and 82 and the electric motors 83, 84, 85, and 86 are selectively drivingly energized and controlled by an electrical control device 102, according to signals which said electrical control device 102 receives from a vehicle road speed sensor 115, a steering angle sensor, a throttle position sensor, a braking sensor, and a shift position sensor if the vehicle is equipped with an automatic type transmission, so as to minimize nose dive, squat, and roll of the vehicle. Furthermore, vehicle height sensors 87, 88, 89, and 90 (each schematically illustrated as a variable resistor although other constructions therefor are possible) are provided respectively to the actuator 2$fr$ for the front right vehicle wheel, the actuator 2$fl$ for the front left vehicle wheel, the actuator 2$rr$ for the rear right vehicle wheel, and the actuator 2$rl$ for the rear left vehicle wheel, each functioning so as to sense the displacement of the piston 4 of its associated actuator (or of the suspension arm associated therewith) relative to its cylinder 3, so as to produce an electrical output signal representative thereof, i.e. representative of the height of the generally corresponding portion of the vehicle body from the road surface; these electrical output signals are fed to the electrical control device 102. Further, for each of the pressure chambers 5 of the actuators 2$fr$, 2$fl$, 2$rr$, and 2$rl$ for the vehicle wheels, there is provided a corresponding pressure sensor, respectively designated by the reference numerals 91 through 94, each of which senses the pressure of the working fluid within its corresponding pressure chamber 5 and produces an electrical output signal representative thereof, said electrical output signal being fed to the electrical control device 102. Accordingly, in this preferred embodiment, information representative of the individual pressures in all of the four pressure chambers 5 is available to the electrical control device 102.

THE CONSTRUCTION OF THE ELECTRICAL CONTROL DEVICE 102

Referring now particularly to FIG. 2, the construction of the electrical control device 102 of the preferred embodiment of the vehicle height adjustment system of the present invention, and of the micro computer designated at 103 incorporated therein, will be explained, insofar as it is relevant to the present invention. This micro computer 103 may, as suggested in FIG. 2, be of per se conventional construction, and in such an exemplary case incorporates a CPU (central processing unit) 104, a ROM (read only memory) 105, a RAM (random access memory) 106, an input port device 107, and an output port device 108, all of these elements being linked together by way of a two way common bus 109.

A vehicle height selection switch 110 is provided in the passenger compartment of the vehicle, capable of being accessed by the vehicle driver. This vehicle height selection switch 110 is settable to any one of three positions, said three positions indicating that the driver desires the vehicle height to be either high (H), normal (N), or low (L), and outputs a signal representative of its setting to the input port device 107 and thus to the micro computer 103. The input port device 107 is also supplied, via a multiplexer 111 and an A/D converter 112, with signals representative of the actual current heights, designated hereinafter as Hfr, Hfl, Hrr, and Hrl, of the vehicle body over the four vehicle wheels outputted by the aforementioned four vehicle height sensors 87, 88, 89, and 90 respectively therefor and amplified by respective amplifiers 87$a$, 88$a$, 89$a$, and 90$a$, with signals representative of the current pressures present in the pressure chambers 5 of the actuators 2$fr$, 2$fl$, 2$rr$, and 2$rl$ respectively for the four vehicle wheels outputted by the aforementioned four pressure sensors 91, 92, 93, and 94 respectively therefor, with a signal representative of the vehicle road speed V outputted from the vehicle road speed sensor 115 and amplified by an amplifier 115$a$, with a signal representative of the steering angle $\alpha$ (considering turning to the right as positive) outputted from the aforementioned steering angle sensor not particularly shown and amplified by an amplifier also not shown, and with a signal representative of the rate of change $\omega$ of the steering angle outputted by the steering angle change rate sensor 114 and amplified by an amplifier 114$a$.

In the ROM 105 there are stored reference vehicle heights Hhf and Hhr, Hnf and Hnr, and Hlf and Hlr. Hhf and Hhr are respectively the desired or target vehicle body heights over the front wheels and over the rear wheels when the vehicle height selection switch 110 is set to high (H); Hnf and Hnr are respectively the desired or target vehicle body heights over the front wheels and over the rear wheels when the vehicle height selection switch 110 is set to normal (N); and Hlf and Hlr are respectively the desired or target vehicle body heights over the front wheels and over the rear wheels when the vehicle height selection switch 110 is set to low (L). Thus Hhf>Hnf>Hlf and also Hhr>Hnr>Hlr. Also in the ROM 105 there are stored values representing maps and values of various types which will be described hereinafter, as well as other constant values. The CPU 104 performs various calculations as will be described shortly, and based upon the results thereof selectively outputs control signals through the output port device 108 for controlling the drive motors 79 through 82 for the respective flow rate control valves 51 through 54 via D/A converters and amplifiers not particularly shown, for controlling the flow rate control valves 18, 32, 19, 33, 28, 39, 29, and 40 via respective D/A converters 117$a$ through 117$d$ and via respective amplifiers 119$a$ through 119$d$, for controlling the ON/OFF switching valves 16, 34, 17, 35, 26, 41, 27, and 42 via respective D/A converters 118$a$ through 118$d$ and via respective amplifiers 120$a$ through 120$d$, and for controlling the drive motors 83 through 86 for the respective ON/OFF switching valves 63 through 66 via D/A converters and amplifiers not particularly shown. Further, to the output port device 108 there is connected a display unit 116 which indicates to the vehicle driver whether or not the desired vehicle height set by said driver on the vehicle height selection switch 110 is currently high (H), normal (N), or low (L).

THEORETICAL DISCUSSION

Generally in a vehicle equipped with a wheel height adjustment device, when the vehicle is travelling around a curve, if feedback control is simply applied to the actual wheel heights Hj, then, because of response delays in the hydraulic systems and the like, there will arise transient temporary variations in wheel height, and as a result the body of the vehicle will undergo rolling. In order positively to prevent this vehicle body rolling, it is considered to be preferable to predict the changes in the wheel heights from the rate of change of the steering angle and the vehicle speed, and, based upon the results of such prediction and on the deviations of the actual wheel heights Hj from the standard wheel heights Hbj, to set the voltage (or the duty ratio or the like) of the actuating electrical energy to be supplied for controlling the supply and draining of working fluid to and from said cylinder chambers 5 of the actuators, so that the vehicle roll amount is brought to be substantially zero. Therefore, if this is expressed algebraically, the result is the equation (a) below:

$$Ej = -Kj(Hj - Hbj) + or.Epj \quad (a)$$

where Kj is a positive constant, Epj is the drive current voltage correction based upon the vehicle body rolling prediction, and the expression "+ or −" is "+" and "−" for "j" being "fr" for the front right wheel or "rr" for the rear right wheel, and "fl" for the front left wheel or "rl" for the rear left wheel, respectively. If G(V) is a gain variable having the vehicle speed as a parameter, and ω is the rate of change of the steering angle, then:

$$Epj = +or - G(V).F(V).\omega$$

where ω in the clockwise sense is taken as positive, and the expression "+ or −" is "+" and "−" for "j" being "fr" for the front right wheel or "rr" for the rear right wheel, and "fl" for the front left wheel or "rl" for the rear left wheel, respectively.

Here, if the voltages of the supplies of actuating electrical energy to be supplied to the supply side and to the drain side electrically controlled flow rate control valves are denoted respectively as Einj and Eoutj, these are then expessed as follows:

if Ej is greater than or equal to zero, then Einj = Ej and Eoutj = 0;

if Ej is less than or equal to zero, then Einj = 0 and Eoutj = −Ej.

Next, the characteristics required for the gain variable G(V) and for the filter F(V) will be described.

First a single wheel model as shown in FIG. 3 will be considered. In FIG. 3, 12 indicates an actuator (one of the actuators 2, in the concrete realization provided by the preferred embodiment of FIGS. 1 and 2) provided for the corresponding vehicle wheel 122, and this actuator 121 comprises a cylinder 123 and a piston 124 of the general types described above, which together define a cylinder chamber 125. This cylinder chamber 125 of the cylinder 123 is connected to an working fluid supply source not shown in the drawing by a conduit 127 having intermediate therealong an electrically controlled flow rate control valve 126; a piston rod 128 of the piston 124 is pivoted to a suspension arm 129 to which the vehicle wheel 122 is rotatably mounted. Also connected to the conduit 127 between the cylinder 123 and the flow control valve 126, by means of a branching conduit 130, there is provided a spring device 131. For the purposes of explanation this spring device 131, which actually of course is a hydraulic or pneumatic spring device, is shown as comprising a cylinder 132 and a piston 133 disposed so as to be reciprocally movable within the cylinder 132, and on one side of the piston 133 a spring chamber 134 is shown as being defined and as being connected with the conduit 130, whereas on the other side of the piston 133 there is shown disposed a compression coil spring 135. At an intermediate point in the conduit 130 is provided a throttle or flow restriction device 136.

In the model shown in FIG. 3, when the equations of motion are taken to a linear approximation the result is as follows:

$$x = q_3/A \quad (1)$$

$$q_2 = G(p_0 - p_2) \quad (2)$$

$$k.y = p_2.a \quad (3)$$

$$a.\dot{y} = q_2 \quad (4)$$

$$q_2 \quad q_3 = Gv.Ep \quad (5)$$

$$m.\ddot{x} = p_0.A - F \quad (6)$$

Here x represents the relative mutual displacement between the cylinder 123 and the piston 124, A represents the cross sectional area of the cylinder chamber 125, y represents the relative displacement (virtual) between the cylinder 132 and the piston 133, a represents the cross-sectional area (virtual) of the spring chamber 134, q2 represents the flow rate of working fluid into the spring chamber 134, q3 represents the flow rate of working fluid into the cylinder chamber 125, p2 represents the pressure within the spring chamber 134, p3 represents the pressure within the cylinder chamber 125, k represents the spring constant (virtual) of the spring 135, C represents the flow passage coefficient of the throttle 136, E represents the voltage (or duty ratio, if such be the control method) of the actuating electrical energy supplied to the flow control valve 126 (when positive the supply side flow control valve is open, when negative the drain side flow control valve is open), Gv represents the gain of said flow control valve 126, F is the external force acting on the piston, and m is the equivalent mass on the cylinder.

By eliminating y from the equations (1) to (6), and then further eliminating q2 and q3, the following equation is obtained, with s as the Lapiacian:

$$x = \frac{\left(\frac{A^2}{C}s + \frac{A^2}{a^2}k\right)\frac{Gv}{A}}{m^2s^2 + \frac{A^2}{C}s + \frac{A^2}{a^2}k} \cdot \frac{Ep}{s} - \frac{1}{ms^2 + \frac{A^2}{C}s + \frac{A^2}{a^2}k} F$$

If in the above we replace $A^2/C$ by O and $(A^2/a^2)k$ by IK, then the above equation is reduced to the following equation (7):

$$x = \frac{(Cs + K)\frac{Gv}{A}}{ms^2 + Cs + IK} \cdot \frac{Ep}{S} - \frac{1}{ms^2 + Cs + IK} F \quad (7)$$

Here C is the equivalent damping coefficient, and IK is the equivalent spring constant.

In order that the vehicle body rolling should be zero, x should be equal to 0, in other words the right hand side of the equation (6) above should be 0. Therefore:

$$Ep = \frac{A^2}{CGv} \cdot \frac{\frac{C}{IK}s}{1 + \frac{C}{IK}s} F \qquad (8)$$

The transmission coefficient of the lateral acceleration $\ddot{y}_c$ when the steering angle is $\alpha$ is per se well known, and is given by the equation (9) following (the steering angle $\alpha$ is considered as being positive for clockwise rotation and negative for anticlockwise rotation, and $y_c$ is considered as being positive in the leftward direction):

$$y_c = \frac{P2s^2 + P1s + P0}{Q2s^2 + Q1s + Q0} \qquad (9)$$

$$P2 = Iz \cdot Koff$$

$$P1 = Koff \cdot Kofr \cdot Lr \cdot Lf/V$$

$$P0 = Koff \cdot Kofr \cdot Lf$$

$$Q2 = M \cdot Iz$$

$$Q1 = \frac{Iz(Koff + Kofr) + M(KoffLf^2 + KoffLr^2)}{V}$$

$$Q0 = \frac{Koff Kofr Lt^2}{V^2} - M(Koff Lf + Kofr Lr)$$

Here P2, P1, P0, Q2, Q1 and Q0 are coefficients given by the above expression, M is the mass of the vehicle, Iz is the moment of inertia of the vehicle, Lf is the horizontal distance from the center of gravity of the vehicle to the axis of rotation of the front wheels, Lr is the horizontal distance from the center of gravity to the axis of rotation of the rear wheels, Lt is the wheelbase (and is equal to Lf×Lr). Kcff is the front wheel cornering power, Kcrf is the rear wheel cornering power, and V is the vehicle speed.

There is an approximately proportional relationship between the lateral acceleration $\ddot{Y}_c$ and the force F acting on the piston of the actuator, and therefore if g is the acceleration due to gravity, and mg is the static weight acting on the actuator, and m0 is a positive constant of proportionality, then the following relation (10) holds:

$$F = my \pm m_0 \ddot{Y}_c \qquad (10)$$

In this equation, since $\dot{Y}_c$ is positive in the leftward direction, the plus or minus sign is "+" for the force acting on the left piston and "−" for the force acting on the right piston.

From the equation (8), (9) and (10), the relation between the steering angle $\alpha$ and the correction value Ep for the voltage of the actuating electrical energy to be supplied to the flow control valve is sought. First, from (8) and (10):

$$Ep = \frac{A^2}{CGv} \cdot \frac{\frac{C}{K}s}{1 + \frac{C}{IK}s} (mg \pm m_0 \ddot{y}_c)$$

$$= \pm \frac{m_0 A^2}{CGv} \cdot \frac{\frac{C}{K}s}{1 + \frac{C}{IK}s} \ddot{y}_c$$

Next, substituting equation (9):

$$Ep = \pm \frac{m_0 A^2}{CGv} \cdot \frac{\frac{C}{IK}}{1 + \frac{C}{IK}s} \cdot \frac{P2s^2 + P1s + P0}{Q2s^2 + Q1s + Q0} s\alpha \qquad (11)$$

$$= \pm \frac{m_0 A^2 P0}{KGrQ0} \cdot \frac{1}{1 + \frac{C}{IK}s} \cdot \frac{\frac{1}{P0}(P2s^2 + P1s + P0)}{\frac{1}{Q0}(Q2s^2 + Q1s + Q0)} \omega$$

$$= \pm G(v) \cdot F(v) \cdot \omega$$

Here G(V), the gain having the vehicle speed as a parameter, $$M_0 A^2 P_0 / IKG_v Q_0$$

and F(V), the filter having the vehicle speed as a parameter:

$$= \frac{1}{1 + \frac{C}{IK}s} \cdot \frac{\frac{1}{P0}(P2s^2 + P1s + P0)}{\frac{1}{Q0}(Q2s^2 + Q1s + Q0)}$$

Figure 4:
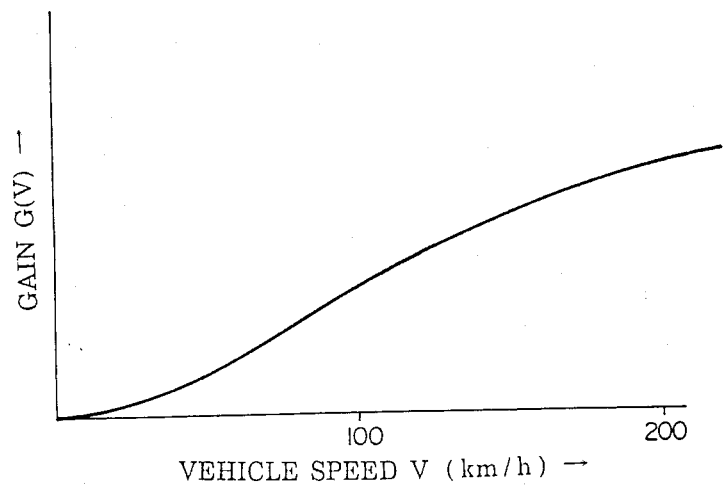
FIG. 4 shows an example of the characteristic variation in the gain G(V) with the vehicle speed.
Figure 5:
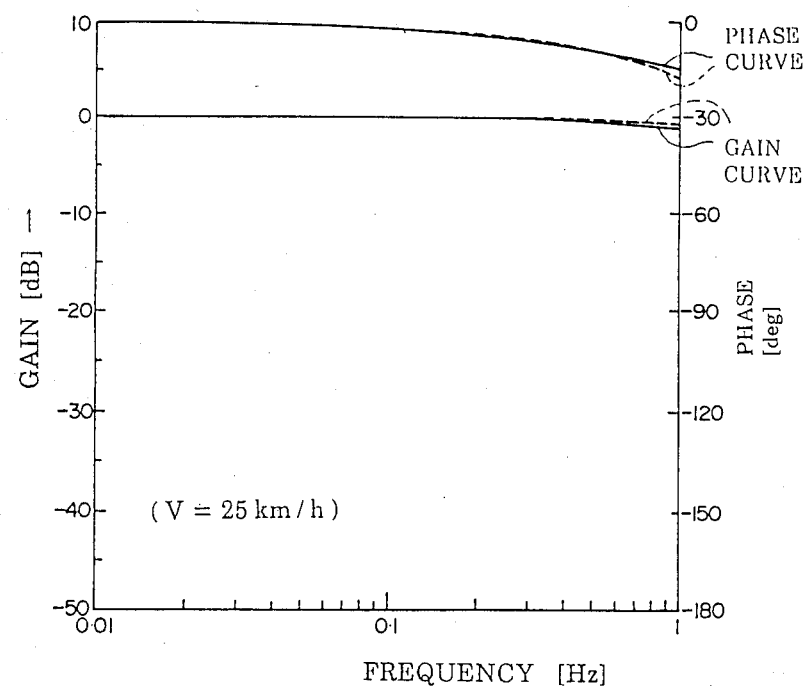
FIG. 5 shows an example of the frequency response characteristic of the filter F(V) for a vehicle speed of 25 km/h.
Figure 6:
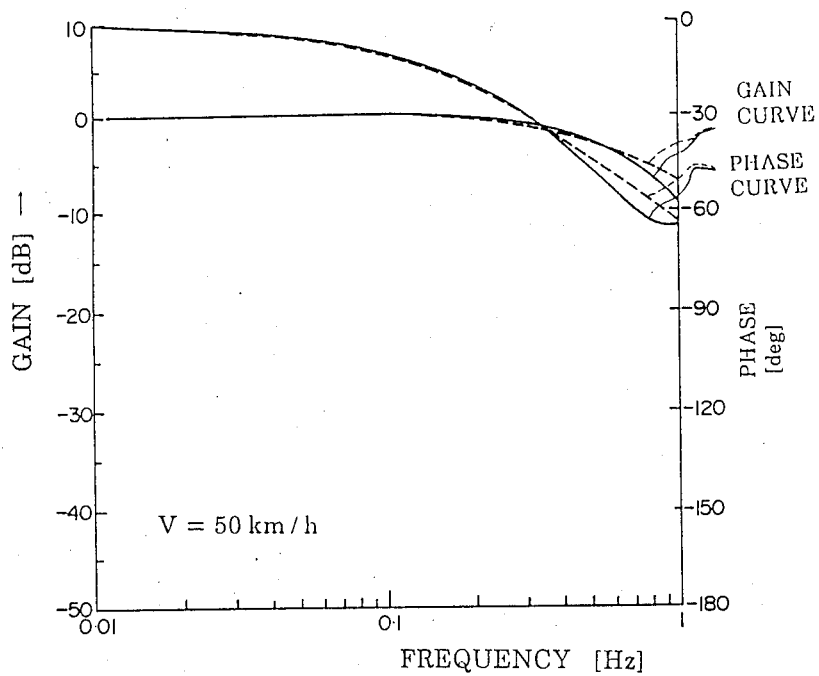
FIG. 6, similarly to FIG. 5 for the vehicle speed of 25 km/h, shows an example of the frequency response characteristic of the filter F(V) for a vehicle speed of 50 km/h.
Figure 7:
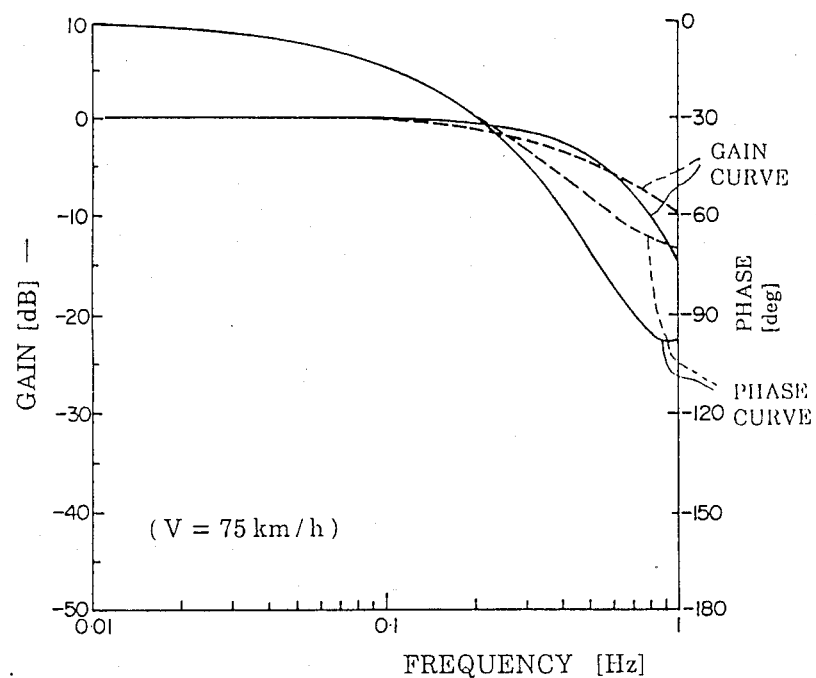
FIG. 7, similarly to FIGS. 5 and 6 for the vehicle speeds of respectively 25 km/h and 50 km/h, shows an example of the frequency response characteristic of the filter F(V) for a vehicle speed of 75 km/h.
Figure 8:
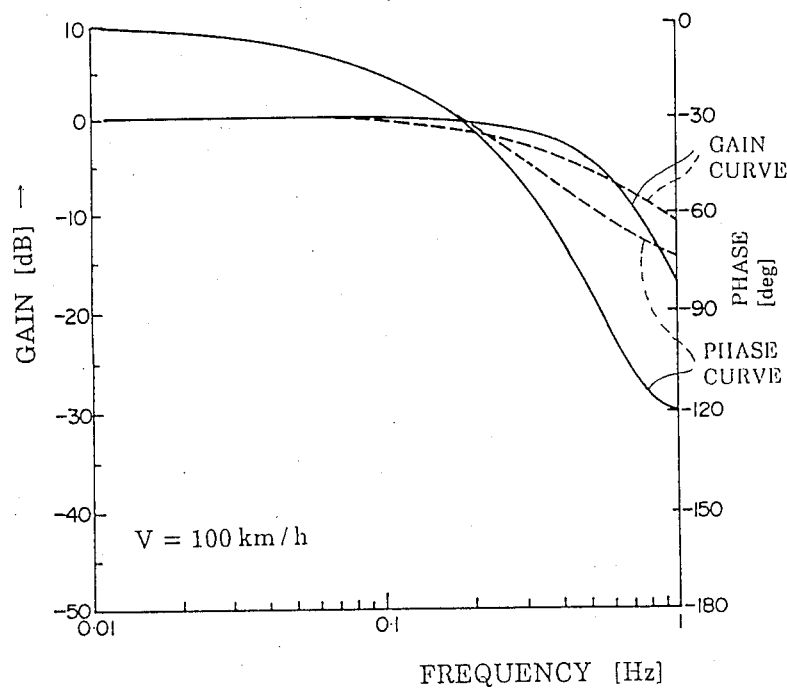
FIG. 8, similarly to FIGS. 5 through 7 for the vehicle speeds of respectively 25 km/h, 50 km/h, and 75 km/h, shows an example of the frequency response characteristic of the filter F(V) for a vehicle speed of 100 km/h.
Figure 9:
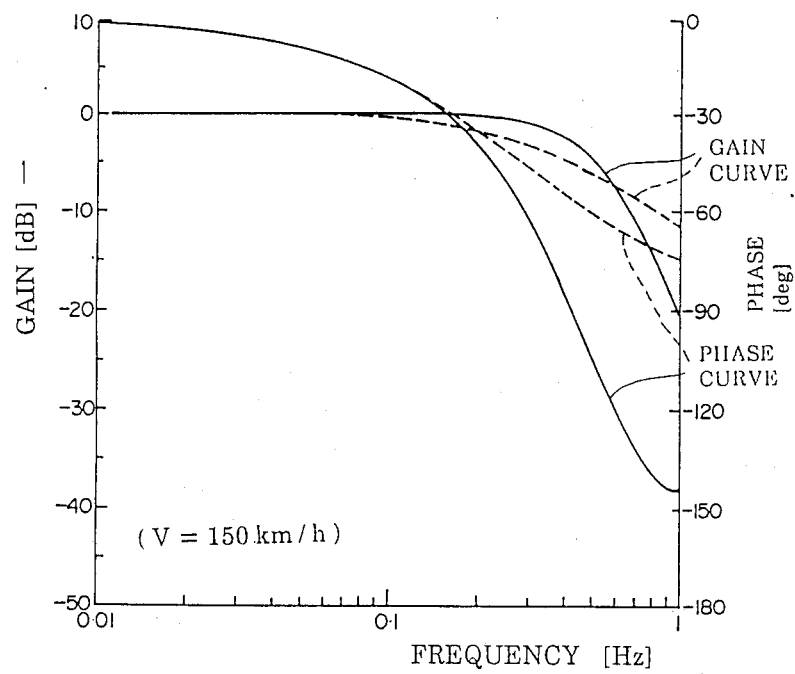
FIG. 9, similarly to FIGS. 5 through 8 for the vehicle speeds of respectively 25 km/h, 50 km/h, 75 km/h, and 100 km/h, shows an example of the frequency response characteristic of the filter F(V) for a vehicle speed of 150 km/h.

An example of the charateristic variation in the gain G(V) with the vehicle speed is shown in FIG. 4, and, for vehicle speeds of 25 km/h, 50 km/h, 75 km/h, 100 km/h and 150 km/h, examples of the frequency response characteristic of the filter F(V) are shown in, respectively, FIGS. 5 through 9. From FIGS. 5 through 9 it will be seen that the frequency response characteristic varies greatly with the vehicle speed.

As it stands, the degree of F(V) is too high, so an approximation is made by the following expression (12) with T(V) as a time constant having the vehicle speed as a parameter:

$$F_{(v)} = \frac{1}{1 + T_{(v)}s} \qquad (12)$$

Figure 10:
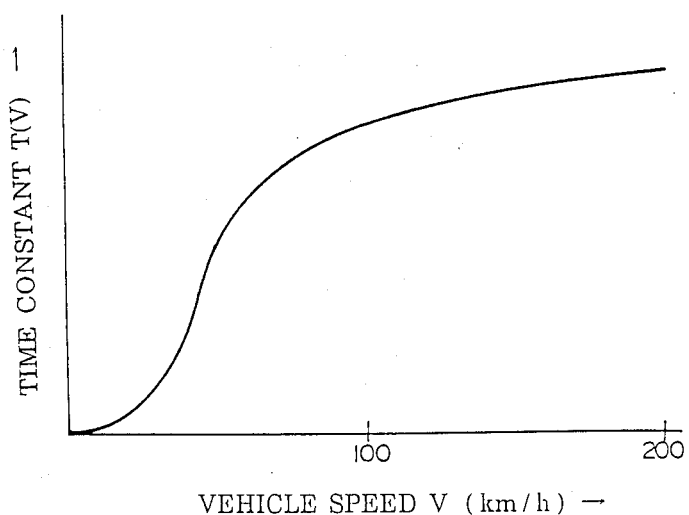
FIG. 10 shows the variation in the value of a time constant T(V) according to the vehicle speed.

This expression is a low band pass filter. The more the degree of the filter increases, the better the approximation becomes. For each of the above vehicle speeds the filter frequency response characteristics for the case in which the frequency response characteristics are most closely approximated are shown by broken lines in FIGS. 5 to 9. Also for that case the variation in the value of the time constant T(V) according to the vehicle speed is shown in FIG. 10.

Although it is possible to derive the values of the gain G(V) and the time constant T(V) by calculation, the computation process in that case is extremely complex, and therefore the values of G(V) and T(V) are stored in a lookup table as functions of the vehicle speed V in the ROM 105 of the micro computer 103 of the electronic control device 102 shown in FIG. 2. Therefore, the correction value Ep of the voltage of the actuating electrical energy supplied to the flow control valves according to the equations (11) and (12) above is obtained by the following procedure. First the values $\xi$ and $\tau$ for the gain G(V) and T(V) according to the vehicle speed detected by the vehicle speed sensor 115 are read in from the ROM 105, and based on these values and the steering angle rate of change $\omega$ detected by the steering angle rate of change sensor 114, the correction value Ep of the voltage is calculated in the CPU 104 following the following equation (13):

$$Ep = \epsilon \cdot \frac{1}{1+\tau s} \omega \qquad (13)$$

THE OPERATION OF THE PREFERRED EMBODIMENT

Referring next to the flow chart shown in FIG. 11, the operation of the micro computer 103 incorporated in the preferred embodiment of the system for vehicle roll control of the present invention as shown in gross detail in FIGS. 1 and 2 will be explained.

First, in the step 1, a signal for the switch function S input from the wheel height selection switch 110 is read in, and thereafter the flow of control passes next to the step 2.

In the step 2, a test is made as to whether the switch function S for indicating the ride height for the vehicle is set to high, and if S is not set to high then the flow of control passes next to the step 3, whereas if S is set to high then the flow of control passes next to the step 4.

In the step 3, a test is made as to whether the switch function S is set to low, and when a decision is made that S is not set to low then the flow of control passes next to the step 5, whereas, when a decision that S is set to low is made then the flow of control passes next to the step 6.

In the step 4, the standard wheel heights Hfr, Hfl, Hrr and Hrl for the front right wheel, the front left wheel, the rear right wheel and the rear left wheel are set respectively to the values Hhf, Hhf, Hhr and Hhr, and thereafter the flow of control passes next to the step 7.

In the step 5, said standard wheel heights Hfr, Hfl, Hrr and Hrl are set respectively to the values Hnf, Hnf, Hnr and Hnr (as remarked before, Hnr is less than Hhr and Hnr is less than Hhr), and thereafter the flow of control passes next to the step 7.

In the step 6, said standard wheel heights Hfr, Hfl, Hrr and Hrl are set respectively to the values Hlf, Hlf, Hlr and Hlr (as remarked before, Hlf is less than Hnf and a fortiori less than Hhf, and Hlf is less than Hnr and a fortiori less than Hhr), and thereafter the flow of control passes next to the step 7.

In the step 7 to which the flows of control thus all coverage, signals representing the actual wheel heights Hj (where "j" is "fr" for the front right wheel, "fl" for the front left wheel, "rr" for the rear right wheel, and "rl" for the rear left wheel) input from the wheel height sensors 87 to 90, and a signal representing the steering angle rate of change $\omega$ and a signal representing the vehicle speed V, input respectively from the steering angle rate of change sensor 114 and the vehicle speed sensor 115, and read in to the micro computer 103; and thereafter the flow of control passes next to the step 8.

Next in the step 8, the deviations between the standard wheel heights set in one or the other of the steps 4 through 6 and the actual wheel heights as read in in the step 7 are calculated according to the following equations, and then the flow of control passes next to the step 9.

$\Delta Hfr = Hfr - Hf$ $\Delta Hfl = Hfl - Hf$ $\Delta Hrr = Hrr - Hr$ $\Delta Hrl = Hrl - Hr$ In the step 9, if the absolute values of the wheel height deviations $\Delta Hj$ (where "j" is "fr" for the front right wheel, "fl" for the front left wheel, "rr" for the rear right wheel, and "rl" for the rear left wheel) obtained in the step 8 are less than control threshold values $\delta j$ (which are positive constants close to zero), then $\Delta Hj$ is regarded as zero, and also if the absolute value for the steering angle rate of change $\omega$ read in in the step 7 is less than a control threshold value $\delta \omega$ (which is also a positive constant close to zero), then $\omega$ is regarded as zero, and then the flow of control passes next to the step 10.

In the step 10, as the gain G(V) and the time constant T(V) in the equations (11) and (12) above, the gain $\xi j$ and the time constant $\tau j$ (where "j" is "fr" for the front right wheel, "fl" for the front left wheel, "rr for the rear right wheel, and "rl" for the rear left wheel) are read in from the corresponding look up tables stored in ROM 105 of the micro computer 103, and then the flow of control passes next to the step 11.

In the step 11, the correction values Ebj for the actuating electrical energy to be supplied to each of the flow control values are computed according to the following expressions, and thereafter the flow of control passes next to the step 12.

$$E_{pfr} = \frac{\epsilon_{fr}}{1+\tau_{fr}s} \omega$$

$$E_{pfl} = \frac{\epsilon_{fl}}{1+\tau_{fl}s} \omega$$

$$E_{prr} = \frac{\epsilon_{rr}}{1+\tau_{rr}s} \omega$$

$$E_{prl} = \frac{\epsilon_{rl}}{1+\tau_{rl}s} \omega$$

In the step 12, the voltage Ej of the actuating electrical energy to be supplied to each of the flow control valves (or the duty ratio, in other implementations) is computed according to the following expression, and thereafter the flow of control passes next to the step 13.

$Ej = -Kj\Delta Hj + Epj$ (where "j" is "fr" for the front right wheel, "fl" for the front left wheel, "rr" for the rear right wheel, and "rl" for the rear left wheel)

In the step 13, if the voltage Ej of the actuating electrical energy to be supplied to each of the flow control valves is zero or is positive, then the voltage Einj of the actuating electrical energy to be supplied to the respective one of the supply side flow control valves 18, 19, 28 and 29 is set to said appropriate Ej, and the voltage Eoutj of the actuating electrical energy to be supplied to the respective one of the drain side flow control valves 32, 33, 39 and 49 is set to zero; whereas, if on the other hand the voltage Ej is negative, then the voltage Einj of the actuating electrical energy to be supplied to the respective one of the supply side flow control valves is set to zero and the voltage Eoutj of the actuating electrical energy to be supplied to the respective one of the drain side flow control valves is set to minus said appropriate Ej (so as to be positive), and thereafter the flow of control passes next to the step 14.

In the step 14, an actuating electrical signal with a voltage of Einj or Eoutj is sent to the solenoids of those of the flow control valves only which are to be supplied with actuating electrical signals of which the voltage is positive, and by, after a short time has elasped, energizing the corresponding electrically controlled on/off switching valves for a certain time, a certain amount of working fluid is supplied to the cylinder chamber 5 of the corresponding actuator 2 or alternatively a certain amount of working fluid is drained from said cylinder chamber 5, whereby the wheel height adjustment is carried out. After the step 14 is completed, the flow of control returns to the step 2, and thereafter the steps 2 to 14 are repeatedly executed in a closed loop until the ignition switch of the vehicle is turned off.

Thus, according to this preferred embodiment of the present invention, at the same time as controlling the supply of working fluid to or the draining of working fluid from the cylinder chamber 5 of each actuator 2 based on the deviations between the actual wheel heights and the standard wheel heights as set according to the setting of the wheel height selection switch 110, a predictive calculation is made of the wheel height fluctuation due to rolling of the vehicle from the steering angle rate of change and the vehicle speed as detected by the seering angle rate of change sensor 114 and the vehicle speed sensor 115, and based on this calculation result a correction is made to the flow of working fluid being supplied to each cylinder chamber 5 or being drained from each cylinder chamber 5 so that wheel height fluctuations substantially do not occur, as a result of which, not only can the vehicle wheel height be adjusted to the standard wheel height, but in such a case that the vehicle is travelling around a curve, for example, the wheel heights can thus be maintained at the standard wheel heights while positively preventing vehicle rolling.

CONCLUSION

Figure 11:
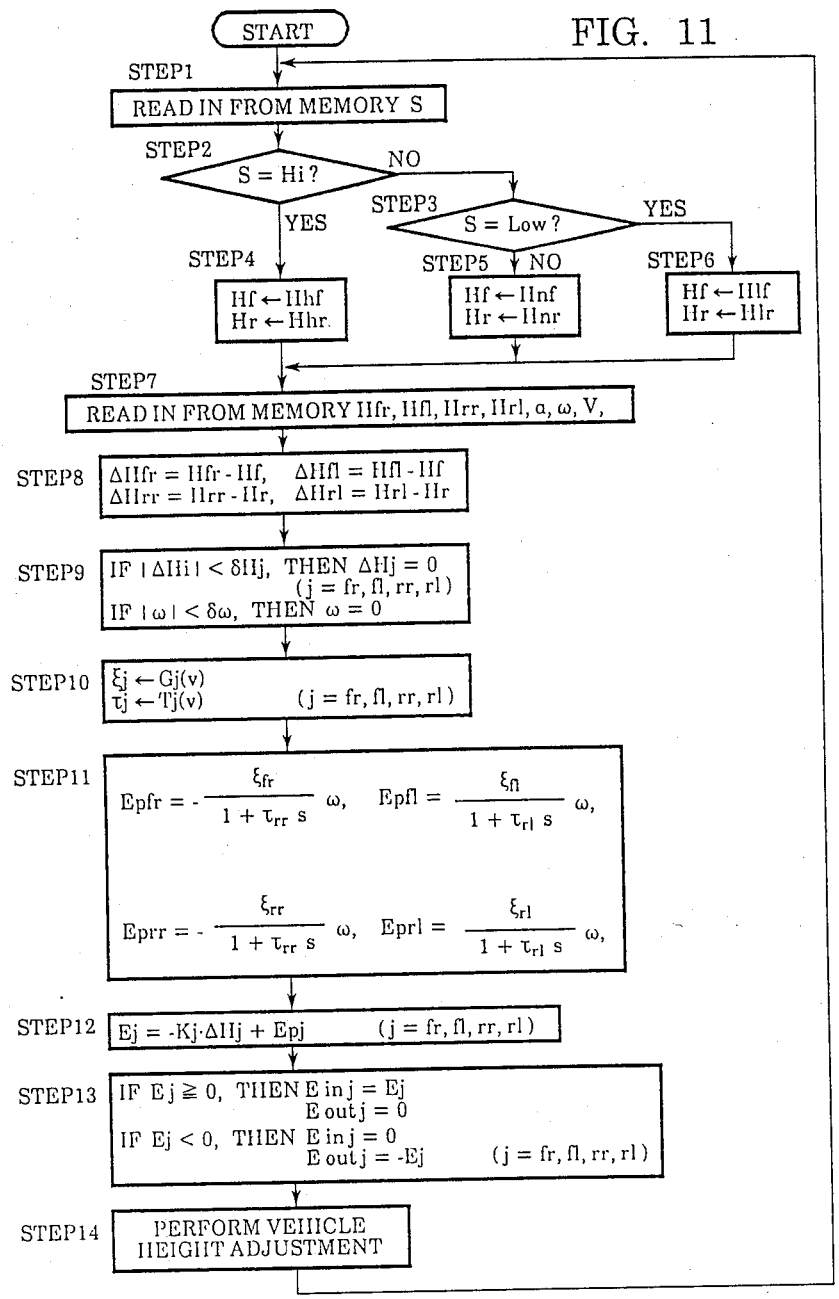
FIG. 11 is a flow chart showing the overall flow of a cyclical program which directs the operation of said micro computer utilized in the preferred embodiment of the vehicle height adjustment of the present invention.

In the routine whose flow chart was shown in FIG. 11, the step 9 may be omitted. Since, however, in the control routine thus shown in the drawings, in the cases that the wheel height deviation $\Delta Hj$ and the steering angle rate of change $\omega$ are less than the respective values $\delta Hj$ and $\delta\omega$, because these values are regarded as zero, the supply and draining of working fluid to and from the cylinder chambers 5 of the actuators 2 is thus not carried out, and as a result the actuating electrical energy necessary for driving the opening and closing of the flow control valves and the ON/OFF switching valves is conserved, and the danger of the occurrence of the so called hunting phenomenon in which the wheel heights are subject to repeated increase and decrease adjustment within a relatively fine range is reduced, and thereby the stability of operation of the wheel height adjustment device can be improved. Moreover, the steering angle rate of change $\omega$ may be obtained, rather than by the use of a special sensor such as the sensor 114 of the shown preferred embodiment, by instead detecting the steering angle $\alpha$, and by setting $\omega$ equal to $\alpha(n)-\alpha(n-1)$, where $\alpha(n-1)$ is the steering angle detected a certain short time interval before $\alpha(n)$, i.e. typically on the previous iteration of the FIG. 11 routine before the current one. Other modifications of the shown preferred embodiment are also possible. Thus, although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. For a vehicle comprising a body and a plurality of wheels upon which said vehicle runs, a vehicle height adjustment system, comprising:
   (a) a corresponding plurality of actuator assemblies, each corresponding to one of said vehicle wheels and resiliently suspending said one of said vehicle wheels from the vehicle body, each said actuator assembly comprising a pressure chamber and increasing and decreasing vehicle height at a location corresponding to each said vehicle wheel as a result of supply and discharge of working fluid to and from each said pressure chamber;
   (b) a corresponding plurality of working fluid supplying and discharging means, each corresponding to one of said actuator assemblies, for supplying and discharging working fluid to and from each said pressure chamber;
   (c) a corresponding plurality of vehicle height detection means, each corresponding to one of said vehicle wheels, for sensing each parameter representative of the height of the vehicle body over each corresponding one of said vehicle wheels;
   (d) a means for detecting the rate of change of steering angle of the vehicle; and
   (e) a computing and control means for controlling said working fluid supplying and discharging means so as to adjust each vehicle height to each standard vehicle height by obtaining each deviation of each actual vehicle height as detected by each said vehicle height detection means from each said standard vehicle height over each said vehicle wheel, performing a prediction calculation of fluctuations in said vehicle height at each wheel caused by vehicle rolling from the rate of change of steering angle as detected by said means for detecting said rate of change of steering angle and the vehicle speed as detected by said vehicle speed detecting means, and carrying out a correction to the adjustment control of each said working fluid supplying and discharging means based upon each said deviation of each said actual vehicle height from each said standard vehicle height by the calculation results.

2. A vehicle height adjustment system according to claim 1, wherein when one of said deviations between one of said actual wheel heights and said corresponding standard wheel height for said vehicle wheel is less than a predetermined value, said computing and control means regards said deviation as zero.

3. A vehicle height adjustment system according to claim 1, wherein when one of said steering angle rates of change is less than a predetermined value, said computing and control means regards said steering angle rate of change as zero.

* * * * *